(12) United States Patent  
Koyama et al.

(10) Patent No.: US 9,493,239 B2
(45) Date of Patent: Nov. 15, 2016

(54) DISPLAY APPARATUS

(71) Applicant: Panasonic Intellectual Property Management Co., Ltd., Osaka (JP)

(72) Inventors: Tatsuya Koyama, Osaka (JP); Kaname Tomita, Osaka (JP); Mitsuhiro Tosa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 23 days.

(21) Appl. No.: 14/645,108

(22) Filed: Mar. 11, 2015

(65) Prior Publication Data

US 2015/0259076 A1    Sep. 17, 2015

(30) Foreign Application Priority Data

Mar. 14, 2014  (JP) ................................ 2014-051522
Dec. 5, 2014   (JP) ................................ 2014-246767

(51) Int. Cl.
   *G08B 21/00*   (2006.01)
   *B64D 11/00*   (2006.01)
   *B64D 45/00*   (2006.01)

(52) U.S. Cl.
   CPC ..... *B64D 11/00151* (2014.12); *B64D 11/0015* (2013.01); *B64D 2045/007* (2013.01)

(58) Field of Classification Search
   None
   See application file for complete search history.

(56) References Cited

U.S. PATENT DOCUMENTS

| | | | | |
|---|---|---|---|---|
| 4,647,980 A * | 3/1987 | Steventon | ................ | H04N 5/64 348/837 |
| 4,897,714 A * | 1/1990 | Ichise | ................ | B64D 11/0015 340/3.51 |
| 5,640,297 A * | 6/1997 | Labaze | ............. | B64D 11/0015 160/127 |
| 6,929,218 B1 * | 8/2005 | Sanford | ............. | B64D 11/0015 244/118.5 |
| 9,004,590 B2 * | 4/2015 | Westerink | .......... | B64D 11/0015 297/217.3 |
| 2001/0023908 A1 | 9/2001 | Romca et al. | | |
| 2006/0075934 A1 * | 4/2006 | Ram | ..................... | B60N 3/004 108/44 |

FOREIGN PATENT DOCUMENTS

JP    2001-301698 A    10/2001

* cited by examiner

*Primary Examiner* — Travis Hunnings
(74) *Attorney, Agent, or Firm* — McDermott Will & Emery LLP

(57) ABSTRACT

A seat monitor includes a display unit that displays various types of information, a frame provided so as to surround the display unit, and an indicator provided to call a staff. The indicator is disposed on a side portion of the frame.

9 Claims, 6 Drawing Sheets

DISPLAY APPARATUS

RELATED APPLICATIONS

This application claims the benefit of Japanese Application No. 2014-051522, filed on Mar. 14, 2014, and Japanese Application No. 2014-246767, filed Dec. 5, 2014, the disclosures of which Applications are incorporated by reference herein.

BACKGROUND

1. Field

The present disclosure relates to a display apparatus equipped with an indicator for calling a staff.

2. Description of the Related Art

Unexamined Japanese Patent Publication No. 2001-301698 discloses a passenger guide device which indicates a seat row and a seat position number of a seat structure provided within an airplane.

More specifically, the passenger guide device disclosed in Unexamined Japanese Patent Publication No. 2001-301698 includes an indication element of an airplane seat. This indication element is provided in correspondence with a seat row of the seat and a position of the seat within the seat row and disposed on the seat at a position visible by a passenger. Another indication element for attachment of a seat row number is provided on an aisle side of a seat backrest of a passenger seat located on the aisle side.

SUMMARY

A display apparatus according to the present disclosure is a display apparatus provided on each of a plurality of arranged seats, including: a display unit that displays various types of information; a frame provided so as to surround the display unit; and an indicator provided on a side of the frame to call a staff.

DETAILED DESCRIPTION

Exemplary embodiments are hereinafter described in detail with reference to the drawings as necessary. In the following description, excessively detailed explanation may be omitted depending on situations. For example, description concerning details of matters already well known or repeated description for substantially identical configurations may be omitted. These omissions are made for avoiding unnecessary redundancy in the following description, and helping those skilled in the art easily understand the description.

The accompanying drawings and the following description are presented only for the purpose of helping those skilled in the art sufficiently understand the present disclosure, and therefore are not intended to limit the subject matters of the appended claims in any way.

(First Exemplary Embodiment)

Seat monitor (display apparatus) 100 according to an exemplary embodiment of the present disclosure is now described with reference to FIGS. 1 through 6.

Figure 1:
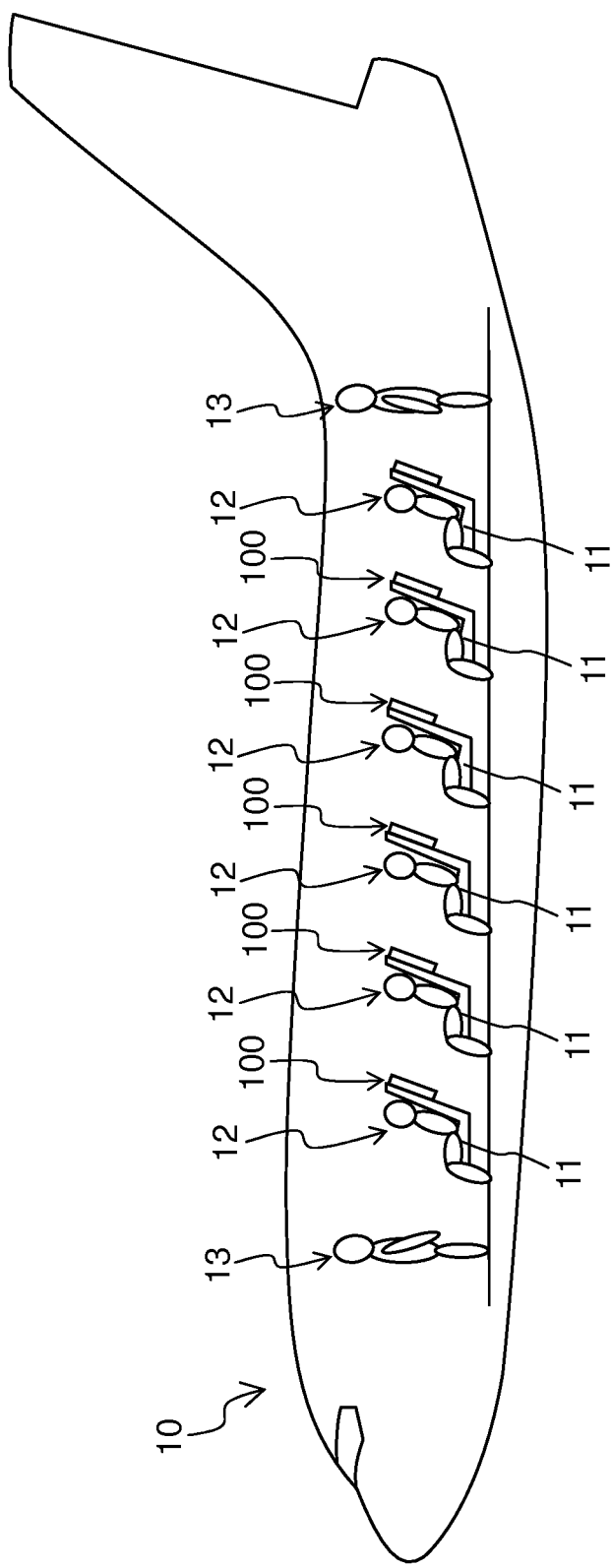
FIG. 1 is a view illustrating a configuration of an interior of an airplane, where a plurality of seat monitors according to an exemplary embodiment of the present disclosure are equipped.

As illustrated in FIG. 1, seat monitor 100 according to this exemplary embodiment is provided on a back side of each head rest of a plurality of seats 11 equipped within airplane 10.

[1-1. Configuration of Seat Monitor 100]

Figure 2:
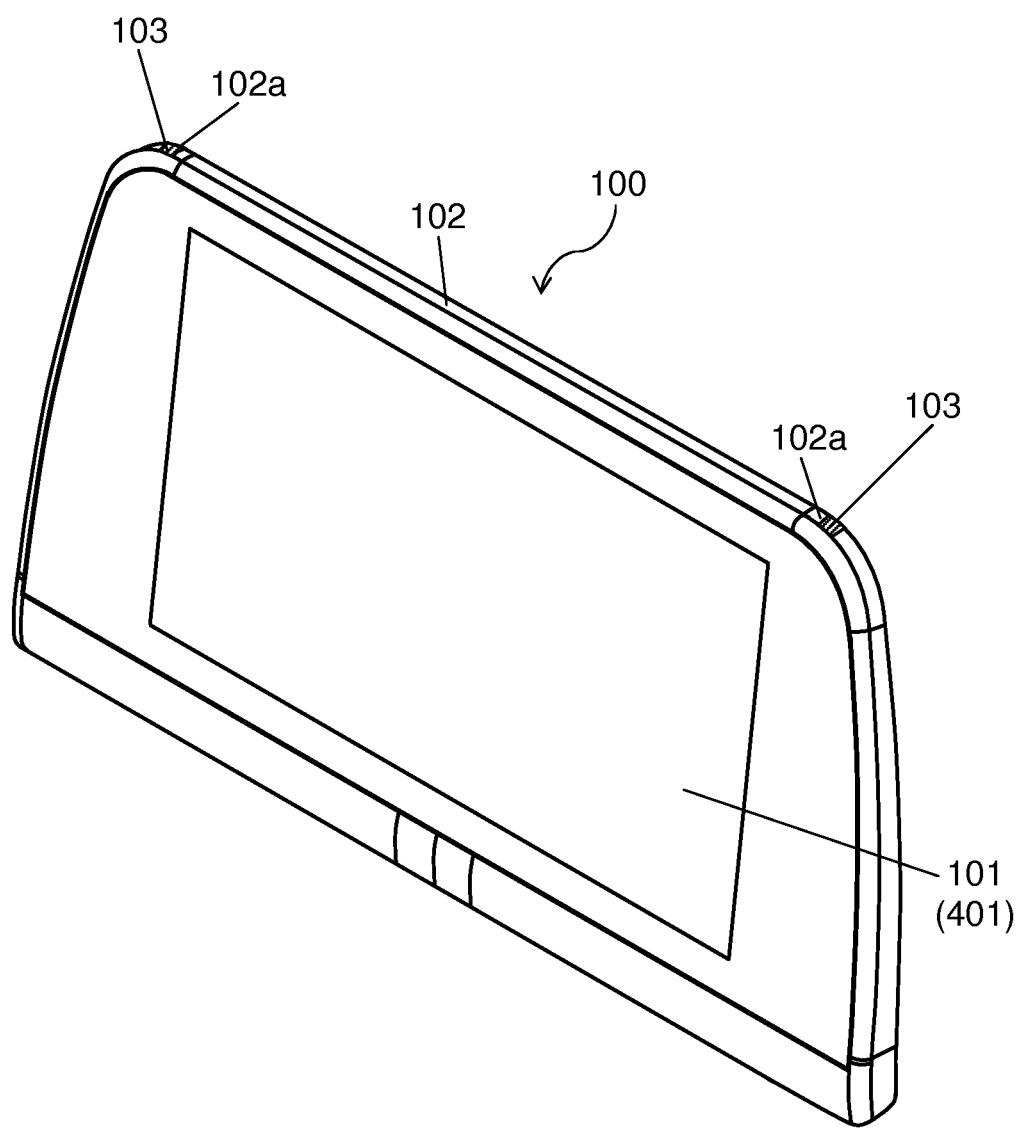
FIG. 2 is a perspective view illustrating one of the seat monitors equipped within the airplane shown in FIG. 1.
Figure 3:
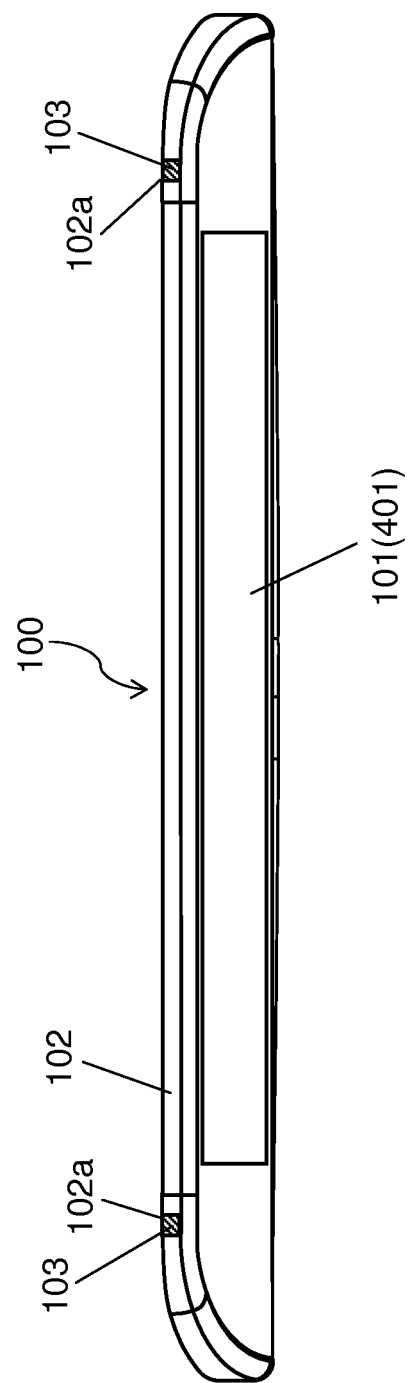
FIG. 3 is a top view of the seat monitor illustrated in FIG. 2.

FIG. 2 is a perspective view of one of seat monitors 100 according to a first exemplary embodiment. FIG. 3 is a top view of one of seat monitors 100 according to the first exemplary embodiment.

Seat monitor 100 is provided on the back side of each head rest of the plurality of seats 11 equipped within airplane 10. Seat monitor 100 includes display unit 101 which displays various types of information such as video, image, and character information, frame 102 provided so as to surround display unit 101, and indicators 103 provided on a side of frame 102.

Display unit 101 includes touch panel 401 (see FIG. 5), and display panel 402 (see FIG. 5), both of which components 401 and 402 will be described below.

Touch panel 401 is a user interface which receives input of touch operation from a user.

Display panel 402 is a so-called display apparatus which displays various types of information including image, video, and character information based on image data processed by graphic controller 405 (see FIG. 5) which will be described later.

Display unit 101 displays data on display panel 402 in accordance with operation of touch panel 401 input from passenger 12 to select various types of desired information including image, video, and character information.

Frame 102 is made of resin, is provided so as to surround an outer circumferential portion of display unit 101, and fixed to a back side of a head of the seat. Frame 102 contains various types of buttons (not shown) and indicators 103.

According to this exemplary embodiment, frame 102 is made of resin. However, the material of frame 102 is not limited to resin, but may be metal or other materials.

Figure 4:
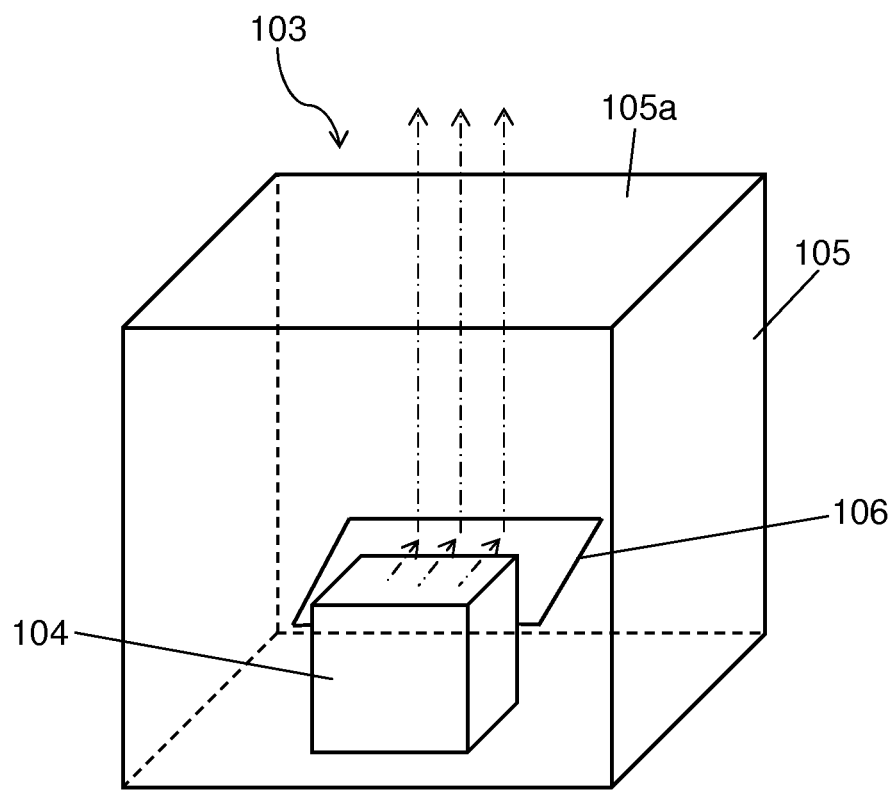
FIG. 4 is an enlarged view of an indicator provided on the seat monitor illustrated in FIG. 2.

FIG. 4 is an enlarged view illustrating a configuration of one of indicators 103.

Indicator 103 is provided on the side of frame 102 which constitutes seat monitor 100. Indicator 103 displays a signal for calling attendant 13 (staff) of airplane 10. More specifically, indicator 103 is disposed on the side of frame 102 at a position invisible as viewed from a front of display unit 101 (display panel 402).

According to this exemplary embodiment, the position of indicator 103 as a location invisible as viewed from the front of display unit 101 in this context refers to a position on the side of frame 102 of display unit 101, or a position shifted toward an inside from the side of frame 102.

A view level of passenger 12 using seat monitor 100 is substantially equivalent to an installation position of indicator 103 of seat monitor 100 (upper surface of frame 102), or lower than indicator 103.

On the other hand, a view level of attendant 13 doing work while moving through a cabin of airplane 10 is higher than the view level of passenger 12 using seat monitor 100, and also higher than the installation position of indicator 103 of seat monitor 100 (upper surface of frame 102).

As illustrated in FIG. 4, indicator 103 includes LED (Light-emitting Diode) 104 and clear cover 105. As illustrated in FIGS. 2 and 3, indicator 103 is embedded in concavity 102a formed at each of left and right ends of the upper surface of frame 102.

LED 104, which functions as a light source for indicator 103, is provided in a lower part of an interior of cubic clear cover 105. When passenger 12 operates the touch panel or presses a button of display unit 101 to make selection for calling attendant 13, for example, LED 104 emits light to notify attendant 13 about this selection.

As illustrated in FIG. 4, LED 104 is disposed in the lower part of the interior of clear cover 105. LED 104 lies at a location shifted toward an inner and lower position from upper surface 105a positioned at the same height position as a height position of the side of frame 102.

As illustrated in FIG. 4, LED 104 emits light in a direction parallel with upper surface 105a. The light emitted from LED 104 is guided upward by reflection mirror 106.

The light emitted from LED 104 travels upward from upper surface 105a (surface leveled with the side of frame 102) of clear cover 105 as illustrated in FIG. 4. In this case, texture or the like may be inserted into a lower surface of clear cover 105 for emphasizing reflection.

As illustrated in FIG. 1, the view level of passenger 12 sitting on the seat and viewing seat monitor 100 is located at a height position substantially equivalent to or slightly lower than a height position of seat monitor 100. In this condition, passenger 12 sitting on the seat disposed in front of display unit 101 does not visually recognize with ease whether or not indicator 103 is lighting.

On the other hand, the view level of attendant 13 doing work inside the cabin of airplane 10 is located at a position higher than passenger 12 sitting on the seat as illustrated in FIG. 1. Moreover, the view level of attendant 13 is located higher than the position of indicator 103. Accordingly, attendant 13 can recognize light guided upward from the side of frame 102 (surface leveled with upper surface 105a of clear cover 105).

According to this exemplary embodiment, LED 104 is employed as the light source of indicator 103. However, the light source of indicator 103 is not limited to an LED but may be other types of light sources such as a light bulb.

Clear cover 105 is fixed to each of the left and right ends of the upper side of frame 102 to guide light emitted from LED 104 in a desired direction.

Accordingly, passenger 12 sitting in front of seat monitor 100 does not recognize a state of light emission from indicator 103. On the other hand, attendant 13 such as a CA (cabin attendant) staying on a back side of display unit 101 of seat monitor 100 can easily recognize the state of light emission from indicator 103, and immediately come to a spot of passenger 12 having performed the calling operation.

Figure 5:
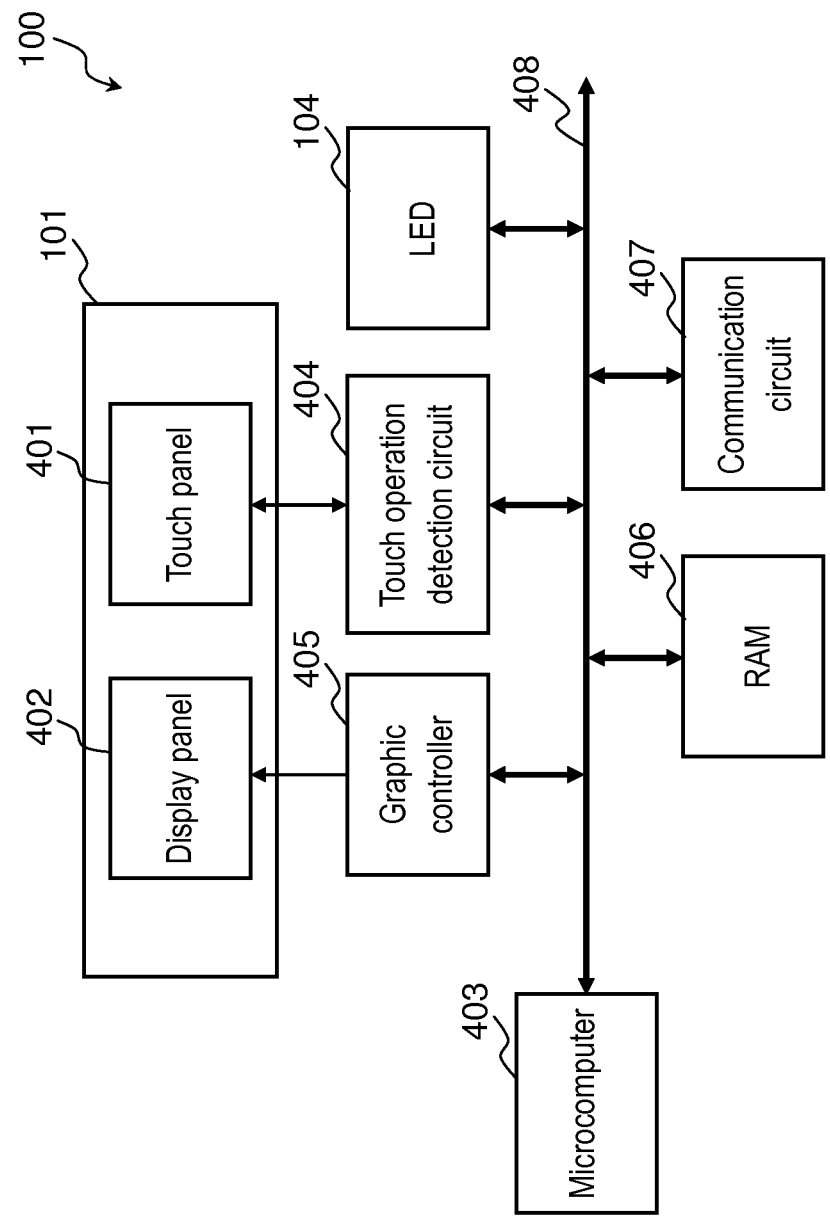
FIG. 5 is a block diagram of the seat monitor illustrated in FIG. 2.

FIG. 5 illustrates a hardware configuration of seat monitor 100.

Seat monitor 100 includes touch panel 401, display panel 402, LED 104, microcomputer 403, touch operation detection circuit 404, graphic controller 405, RAM (Random Access Memory) 406, communication circuit 407, and bus 408.

Touch panel 401 is constituted by an insulator film layer made of glass, plastics or the like, an electrode layer, and a substrate layer provided with touch operation detection circuit 404 which executes calculations. These layers are laminated in this order from a front side of touch panel 401 corresponding to a side operated by passenger 12.

The electrode layer contains transparent electrodes arranged in matrix along an X axis (such as horizontal axis) and a Y axis (such as vertical axis).

Touch operation detection circuit 404 sequentially scans the matrix containing the X axis and Y axis. Touch operation detection circuit 404 detects that touch operation has been executed for a certain position based on a capacitance change at the corresponding position. In accordance with this detection, touch operation detection circuit 404 creates coordinate information with a density (resolution) equivalent to or higher than a density of pixels of display panel 402. Moreover, touch operation detection circuit 404 successively outputs a series of coordinate data detected based on the touch operation.

This coordinate data is received by microcomputer 403 (described below), and detected as various types of touch operation (such as tap, drag, flick, and swipe).

Microcomputer 403 is a processing circuit (such as CPU (Central Processing Unit)) which executes various types of processing (described below) based on information on a touch position input from the user and received from touch operation detection circuit 404. Microcomputer 403 also performs ON/OFF control of LED 104 connected with microcomputer 403 via bus 408.

Graphic controller 405 operates in accordance with a control signal generated by microcomputer 403. Graphic controller 405 creates image data to be displayed on display panel 402 and controls display operation of display panel 402.

RAM 406 is a so-called work memory. Computer programs executed by microcomputer 403 to operate seat monitor 100 are loaded to RAM 406.

Communication circuit 407 is a circuit for realizing communication with the Internet, a personal computer and the like, for example. More specifically, communication circuit 407 is a wireless communication circuit conforming to Wi-Fi standard, and/or Bluetooth (registered trademark) standard, for example.

Bus 408 is a signal line electrically connecting the foregoing constituent elements of seat monitor 100 except for touch panel 401 and display panel 402, for mutual connections between the connected elements to allow signal exchange between one another through the mutual connections.

[1-2. Operation]

Hereinafter discussed is operation of seat monitor 100 thus constituted.

Figure 6:
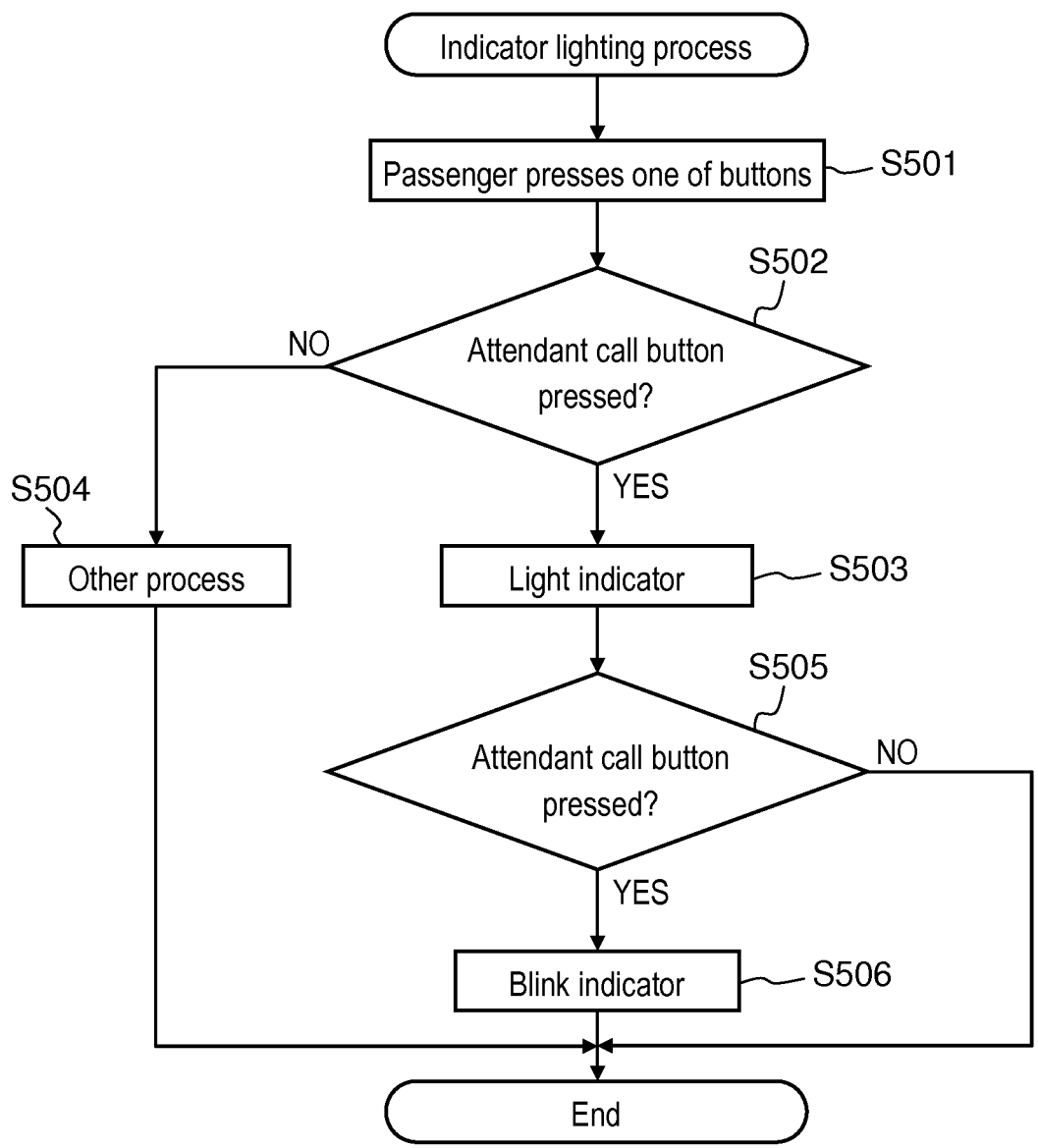
FIG. 6 is a flowchart describing operation of the seat monitor illustrated in FIG. 2.

FIG. 6 is a flowchart describing operation of seat monitor 100 according to this exemplary embodiment, particularly touching upon operation executed when an attendant call button is pressed.

Initially, passenger 12 presses any one of buttons displayed on display unit 101 (S501).

Subsequently, microcomputer 403 determines whether or not the attendant call button has been pressed (S502).

When it is determined that the attendant call button has been pressed (YES in S502), microcomputer 403 lights indicators 103 (S503).

When it is determined that a button other than the attendant call button has been pressed (NO in S502), a process corresponding to the pressed button is executed (S504).

Under a state where indicators 103 are lighting, microcomputer 403 again determines whether or not the attendant call button has been pressed (S505).

When it is determined that the attendant call button has been pressed in this step (YES in S505), microcomputer 403 blinks indicators 103 (S506).

As in this example, a call expressing a higher emergency may be issued when the attendant call button is pressed in two stages.

According to this exemplary embodiment, seat monitor 100 provided on any of the seats within airplane 10 may be so controlled that only indicator 103 disposed on an aisle side and easily recognizable by attendant 13 can be lighted by individual control of lighting of indicators 103 for each seat.

[1-3. Advantageous Effects and Others]

As described above, seat monitor 100 according to this exemplary embodiment includes display unit 101 that displays video data or the like, frame 102 provided so as to surround display unit 101, and indicators 103 provided on the side of frame 102.

According to this configuration, indicators 103 disposed on the side of frame 102 light when passenger 12 operates a touch panel or a hand set, for example. In this case, only attendant 13 can recognize the lighting without disturbing other passengers 12.

In conventional cases, an attendant call request is recognized only at a predetermined spot such as a galley where attendant 13 waits. According to the foregoing configuration, however, attendant 13 easily recognizes a call request from passenger 12 even while staying in a place different from the galley or the like.

Other Exemplary Embodiments

The first exemplary embodiment has been described herein as an example of a technology disclosed in the present application. However, the technology according to the present disclosure is not limited to this example, but may be applied to exemplary embodiments including modifications, replacements, additions, omissions and others. In addition, respective constituent elements described in the foregoing first exemplary embodiment may be combined to present different exemplary embodiments.

(A)

According to the exemplary embodiment discussed herein as a specific example, the technology of the present disclosure is applied to seat monitor 100 provided on each back side of the head rests of seats 11 equipped within airplane 10. However, the present disclosure is not limited to this example.

The technology of the present disclosure is similarly applicable to a seat monitor raised from feet of a passenger at the time of use, as well as a seat monitor provided on a back side of a head rest of a seat.

The technology of the present disclosure is also applicable to a display apparatus provided on a seat equipped within a train, a bus, a vessel, or other moving bodies other than airplane 10.

The technology of the present disclosure is further applicable to a display apparatus provided in a hall or other public places where a plurality of seats equipped with personal monitors are arranged, as well as a display apparatus provided in a moving body.

Accordingly, a target to be called by the indicators is not limited to attendant 13 of airplane 10 or the like, but may be a staff who takes an order of a meal, a drink or the like from a passenger sitting on a seat.

(B)

According to the exemplary embodiment discussed herein as a specific example, the installation positions of indicators 103 are located on the side of frame 102 of display unit 101. However, the present disclosure is not limited to this example.

For example, indicators may be disposed on a back side of the frame when the entire back side of the seat monitor is not embedded into the seat.

In this case, the indicators are located at positions not visually recognizable with ease by a person viewing a monitor screen from the front of the display unit similarly to the foregoing exemplary embodiment. In this arrangement, a staff such as a CA can accurately recognize a call.

(C)

According to the exemplary embodiment discussed herein as a specific example, a button displayed on display unit 101 is pressed when indicators 103 are desired to be lighted. However, the present disclosure is not limited to this example.

For example, indicators 103 may be lighted by pressing a button provided on the frame or the hand set.

(D)

According to the exemplary embodiment discussed herein as a specific example, indicators 103 are lighted in response to a press of the attendant call button. However, the present disclosure is not limited to this example.

For example, when one type of light source (LED) is used, different types of displays, such as two types of display patterns of lighting and blinking, may be produced in accordance with types of calls, such as a call for an attendant and an order of food and drink. This method allows an attendant to handle calls more smoothly based on a distinction between lighting and blinking.

In addition, various color patterns may be prepared so that indicators can light or blink using lights in different colors, rather than only using light emitted from one type of light source.

This method allows lighting or blinking of the indicators in different colors in accordance with types of calls, realizing displays for representing a wider variety of calls.

In this case, a staff having recognized a call can check a color of emission light from the indicators, and a difference between lighting and blinking, and predict contents of the call beforehand.

(E)

According to the exemplary embodiment discussed herein as a specific example, each of the indicators contains an LED as a light source. However, the present disclosure is not limited to this example.

For example, an indicator which changes a display color by opening and closing a shutter may be adopted.

In this case, a display easily recognizable by a staff without causing a disturbance of the user is realized similarly to the foregoing exemplary embodiment.

The present disclosure is applicable to a display apparatus equipped with a frame provided so as to surround a display unit. More specifically, the present disclosure has wide applicability to a seat monitor equipped in various types of moving bodies such as an airplane, a bus, and a train, and a display apparatus equipped in public places such as a hall where monitors are equipped on respective seats.

What is claimed is:

1. A display apparatus for a passenger in a moving body, the display apparatus comprising:
   a display unit having a length, a width, and a thickness, and having a display surface, various types of information being displayed on the display surface;
   a frame surrounding the display unit, a portion of the frame having a width extending in a thickness direction of the display unit and having an opening, the thickness direction being perpendicular to the display surface; and
   an indicator entirely disposed within the opening to call an attention to an attendant, no portion of the indicator projecting from the opening.

2. The display apparatus according to claim 1, wherein the indicator produces respective displays in different colors in accordance with types of operation of the call.

3. The display apparatus according to claim 1, wherein
   the display apparatus is attached to a back of a first seat in the moving body, the passenger sitting on a second seat behind the first seat, and
   the opening is located at a position substantially equivalent to or higher than the passenger's eye level and lower than the attendant's eye level.

4. The display apparatus according to claim 1, wherein the portion of the frame is disposed on an upper side of the display unit and extends at least between a leftmost end and a rightmost end of the display unit.

5. The display apparatus according to claim 4, wherein the opening is disposed at one of a left side or a right side of the portion.

6. The display apparatus according to claim 4, wherein the indicator comprises:
   a light source to emit light in a direction parallel to the portion of the frame, the portion extending in its width direction and extending between the leftmost end and the rightmost end of the display unit, and
   a reflector for reflecting the light to be emitted from the indicator in the opening.

7. The display apparatus according to claim 1, wherein the indicator produces patterns different from each other in accordance with types of operation of the call.

8. A display apparatus provided on each of a plurality of arranged seats, the display apparatus comprising:
   a display unit having a display surface on which various types of information are displayed;
   a frame provided so as to surround the display unit; and
   an indicator provided on a side of the frame to call an attention to an attendant , wherein
   the indicator disposed in a position of the frame, the indicator in the position being invisible from a passenger facing the display surface.

9. The display apparatus according to claim 8, wherein the indicator produces patterns different from each other in accordance with types of operation of the call.

* * * * *